United States Patent [19]

Ota et al.

[11] Patent Number: 5,389,418

[45] Date of Patent: Feb. 14, 1995

[54] FLEXIBLE MAGNETIC RECORDING DISK AND METHOD FOR PREPARING THE SAME

[75] Inventors: Masataka Ota; Yasushi Endo; Satoru Hayakawa; Toshio Kawamata, all of Kanagawa, Japan

[73] Assignee: Fuji Photo Film Co., Ltd., Kanagawa, Japan

[21] Appl. No.: 108,455

[22] Filed: Aug. 19, 1993

[30] Foreign Application Priority Data

Aug. 21, 1992 [JP] Japan .................................. 4-244007

[51] Int. Cl.$^6$ .............................................. G11B 5/00
[52] U.S. Cl. ...................................... 428/64; 428/212; 428/213; 428/323; 428/336; 428/694 BN; 428/694 BS; 428/900
[58] Field of Search ............... 428/323, 336, 212, 213, 428/694 BN, 694 BS, 900, 64

[56] References Cited

U.S. PATENT DOCUMENTS

| | | | |
|---|---|---|---|
| 4,721,646 | 1/1988 | Iechika et al. | 428/143 |
| 5,001,006 | 3/1991 | Saito et al. | 428/323 |
| 5,057,364 | 10/1991 | Saito et al. | 428/323 |
| 5,122,414 | 6/1992 | Shimizu et al. | 428/323 |

FOREIGN PATENT DOCUMENTS

| | | | |
|---|---|---|---|
| 3408000 | 9/1985 | Germany . | |
| 58-85931 | 5/1983 | Japan | G11B 5/70 |
| 62-038533 | 2/1987 | Japan . | |
| 62-086541 | 4/1987 | Japan . | |
| 62-154225 | 7/1987 | Japan | G11B 5/704 |
| 63-100612 | 5/1988 | Japan . | |
| 4-006616 | 1/1992 | Japan . | |

*Primary Examiner*—Stevan A. Resan
*Attorney, Agent, or Firm*—Sughrue, Mion, Zinn, Macpeak & Seas

[57] ABSTRACT

There is disclosed a flexible magnetic recording disk which is suitable as a high capacity magnetic disk for data recording and has an excellent durability. The flexible magnetic recording disk comprises a non-magnetic support having thereon a non-magnetic layer comprising a non-magnetic powder and a binder resin, and a magnetic layer comprising a ferromagnetic powder and a binder resin, in this order, wherein the magnetic layer has a thickness of 1 μm or less, which is ½ or less of the thickness of the non-magnetic layer; and the magnetic layer further contains the abrasive particles which comprise a first abrasive particles having a Mohs' hardness of 6 or more and an average particle size of 0.8 to 1.4 times as large as the average particle size of the magnetic powder and a second abrasive particles having a Mohs' hardness of 6 or more and an average particle size of 2 to 4 times as large as the average particle size of the ferromagnetic powder.

11 Claims, No Drawings

FLEXIBLE MAGNETIC RECORDING DISK AND METHOD FOR PREPARING THE SAME

FIELD OF THE INVENTION

The present invention relates to a high density magnetic recording medium, specifically to a flexible magnetic recording disk which is suitable as a high capacity magnetic disk for data recording and has an excellent durability.

BACKGROUND OF THE INVENTION

Magnetic recording techniques have a number of excellent characteristics which are not provided by other recording systems, such as the ability to repeatedly use the recording medium, ease of conversion of input data into an electronic signal, the ability to combine the recording technique with relevant equipment to form a system, and the ability to readily process a signal. Accordingly, magnetic recording techniques have been extensively applied to various fields such as the video, audio and computer fields. In order to meet the demand for miniaturization of equipment, enhancement of recorded and reproduced signals, the trend to longer recording, and an increase in recording capacity, further improvement in recording density is needed. For a coating type magnetic recording disk, various means have been proposed in which the particle size of the ferromagnetic powder is decreased, the dispersibility thereof is improved, and the packing density in a magnetic layer is increased. In another effective means, a ferromagnetic metal powder and a hexagonal ferrite having excellent electromagnetic characteristics have been used.

The widespread use of OA equipment (i.e., Office Automation Equipment) such as a minicomputer and a personal computer has been accompanied by a marked increase in the popularity and use of magnetic recording disks. A magnetic recording disk is used and stored under broad environmental conditions of temperature and humidity and in dusty environments. But an improvement in recording density is strongly desired in order to achieve a large data recording capacity and miniaturization of the recording disks. In order to obtain a magnetic recording disk suitable for high density recording with an acicular ferromagnetic powder as in the past, it was necessary to employ a maximum size of the acicular ferromagnetic powder sufficiently smaller than the recording wavelength or a record bit length. At present, an acicular ferromagnetic powder having a size of 0.3 $\mu$m has already been put to practical use, which makes it possible to record at wavelengths of 1 $\mu$m or less.

It is necessary to further reduce the size of the acicular ferromagnetic powder in order to obtain a medium which enables even higher density recording. However, such small-sized acicular ferromagnetic powder is disadvantageous in that the thickness thereof, which is 100Å or less, is very fine and the particle volume thereof, which is about $10^{-17}$ cm$^3$, is very small. Consequently, the electromagnetic characteristics thereof are reduced by thermal disturbance and surface effects, so that sufficient orientation cannot be obtained by applying a magnetic field to a coated magnetic layer.

In recent years, a high recording density magnetic recording medium has been developed based on a hexagonal series ferrite powder which is tabular and has an axis of easy magnetization in the perpendicular direction to a plate, as a ferromagnetic powder as described, for example, in U.S. Pat. No. 4,425,401 corresponding to JP-A-58-6525 (the term "JP-A" as used herein means an unexamined published Japanese patent application) and JP-A-58-6526. This ferromagnetic powder allows for an average particle size of 0.05 $\mu$m and high density recording.

Furthermore, a narrow track width is required for high density recording. In order to satisfy these requirements, the development and application of a magnetic disk comprising ferromagnetic metal powder and ferromagnetic hexagonal series ferrite for size miniaturization and improvement in recording density have been intensively investigated. In particular, the shift towards a thinner magnetic layer and high output are desired for achieving a high recording density and an improved overwriting electromagnetic characteristic. However, there is a concern that the shift towards a thinner magnetic layer might be accompanied by extreme deterioration of running durability.

An overwrite of the recording signals with different magnetic wavelengths is usually necessary in a magnetic recording disk for a computer such as a floppy disk. It was sufficient in the past to carry out the overwrite of two kinds of signals, 1f and 2f, which are in a relationship of two times in terms of frequency. However, not only a shorter recording wavelength, but also an overwrite of a plurality of RLL signals with a frequency ratio of 3:8 present at a broader range, are required for a magnetic recording disk with a high capacity of 10M bites, in which high capacity has been strongly desired in recent years. Where a signal having a short recording wavelength and a large difference in recording frequency is used, improvement in the electromagnetic characteristics of the magnetic layer was the only limiting factor for successfully overwriting a signal with a short recording wavelength on a signal with a long recording wavelength as disclosed in U.S. Pat. No. 4,788,092 corresponding to JP-A-58-122623 and U.S. Pat. No. 4,895,758 corresponding to JP-A-61-74137.

In conventional magnetic layers with a thickness of 1.0 $\mu$m or more, overwrite of a signal with a shorter wavelength on a formerly recorded signal with a longer wavelength cannot erase the formerly recorded signal since a line of magnetic force cannot reach through the entire depth of the magnetic layer.

Furthermore, an improvement in recording density is accompanied by a narrower gap between the recording heads, which causes difficulty in sufficiently recording in the thickness direction of the medium.

In order to solve the above problem, a thin magnetic layer of 1 $\mu$m or less was proposed. However, the thin magnetic layer was liable to peel off and good running durability (a main factor for preventing dropout) could not be obtained, thus deteriorating reliability.

Accordingly, in developing a magnetic recording disk having the desired high density recording, improvement in reproducing output, securing an overwriting characteristic and running durability, in particular, have become obstacles.

Electrification in running a magnetic recording disk increases the number of dropouts attributable to adherence of dust, and the error rate thereby has become a fatal defect. In order to solve this electrification problem, methods are employed in which an additive is added to prevent electrification in the magnetic layer.

Among them, the method in which carbon black is added is the most effective and broadly applied. However, in the above magnetic recording disk for high density recording, the addition of carbon black lowers the packing degree of the magnetic substance to deteriorate the output. Therefore, the addition amount of the carbon black is limited, so that the antistatic effect is insufficient.

Various proposals for preventing electrification and providing high output and improved durability are disclosed in JP-A-55-55431, JP-A-55-55432, JP-A-55-55433, JP-A-55-55434, JP-A-60-164926, JP-A-55-55436, JP-A-62-38523, and JP-A-62-159337.

Namely, an intermediate layer is provided between a magnetic layer and a support, wherein the intermediate layer containing carbon black and a binder resin is coated and then the magnetic layer is formed thereon.

However, it has not been possible to achieve even with this method, excellent electromagnetic characteristics, that is, a high reproduction output, an overwrite characteristic and a sufficient running durability in the above high density recording magnetic recording medium.

In order to obtain high capacity and high output electromagnetic characteristics, it is proposed to make the magnetic layer thinner, for example, in the following examples.

1) JP-A-57-198563 (the term "JP-A" as used herein means an unexamined published Japanese patent application):

There is disclosed an attempt in which a resin layer containing no fine powders is previously coated under a magnetic layer and then an extremely thin magnetic layer is coated to reduce a self-demagnetization.

With this method, however, the surface property of the magnetic layer is not sufficient, and further the problem that the increase in the thickness of the resin layer accelerates curling due to shrinkage of the resin occurs.

2) JP-A-62-154225:

There is proposed a method in which the thickness of the non-magnetic layer is increased more than that of the magnetic layer to decrease the relative thickness of the magnetic layer. The yield in this magnetic recording medium is very inferior and the manufacturing process thereof is complicated. Accordingly, there is a problem in the practicality thereof.

3) JP-A-63-187418:

There is described a method in which a lower non-magnetic layer and an upper magnetic layer are simultaneously coated while wet to thereby obtain a magnetic layer of 2 µm or less. According to this method, the magnetic layer can be thinned by as much as 1 µm or less and in addition, a magnetic layer with an excellent surface property can be obtained, whereby the magnetic recording layer having relatively excellent electromagnetic characteristics can be obtained. However, even this method provides electromagnetic characteristics which are still insufficient as compared with those of a thin layer type magnetic recording medium, and the requirement for an increase in recording density in the future will not be met.

Further, there have been disclosed various means in which abrasive particles are used in order to improve running durability. The examples thereof are described below.

4) JP-A-60-93631:

It is disclosed to use abrasive particles having a presence density of 20 particles or more per 100 $\mu m^2$ on a magnetic layer surface and a particle size of more than 1.5 times or less as large as that of the ferromagnetic powder. This is effective for a video tape, but running durability can not be provided at all in the magnetic recording disk.

5) JP-A-61-57036:

It is disclosed that 0.25 particle/$\mu m^2$ or more density is required for the abrasive on a surface. However, when such a large amount of the abrasive is present, durability is improved but the electromagnetic characteristics are not suited to a high density recording.

6) JP-A-58-85931:

It is disclosed to use two kinds of abrasives, each having a different particle size. However, it is difficult to obtain a durability which is compatible with high output in a disk medium such as a floppy disk, simply by use of two kinds of abrasives each having a different size for a high recording density medium.

As described above, it is difficult to obtain a running durability which is compatible with the electromagnetic characteristics, and an effective solution to this requirement is desired.

SUMMARY OF THE INVENTION

The present invention has been made to overcome the problems with the above mentioned conventional techniques. Thus, an object of the present invention is to provide a high density flexible magnetic recording disk having good electromagnetic characteristics and an excellent running durability.

These and other objects of the present invention can be achieved by:

1) a magnetic recording disk comprising a nonmagnetic support having thereon (1) a non-magnetic layer mainly comprising a non-magnetic powder and a binder resin, and (2) a magnetic layer mainly comprising a ferromagnetic powder and a binder resin, in this order. The above magnetic layer has a thickness of 1 µm or less, which is ½ or less of the thickness of the non-magnetic layer. Abrasive particles contained in the above magnetic layer comprise a first abrasive particle having a Mohs' hardness of 6 or more and an average particle size of 0.8 to 1.4 times as large as the average particle size of the above ferromagnetic powder and a second abrasive having a Mohs' hardness of 6 or more and an average particle size of 2 to 4 times as large as the average particle size of the above ferromagnetic powder, 2) a method for preparing the above described flexible magnetic recording disk, comprising the steps of applying a non-magnetic layer coating solution on the above non-magnetic support to form the above non-magnetic layer; applying thereon a magnetic layer coating solution while the non-magnetic layer formed remains in a wet condition; subsequently drying; and then providing a surface treatment, and 3) a method for preparing the above described flexible magnetic recording disk, in which the above first abrasive particles are subjected to a dispersion treatment together with the above ferromagnetic powder in a binder resin solution and then the above second abrasive particles are added thereto to thereby prepare the above magnetic layer coating solution.

DETAILED DESCRIPTION OF THE INVENTION

In the present invention, the presence density of the abrasive particles (i.e., the first and second abrasive particles) in the above magnetic layer is preferably 0.16 to 0.24 particle/$\mu$m$^2$ (particularly preferably 0.18 to 0.23), and the above ferromagnetic powder is preferably a ferromagnetic metal powder.

In the present invention, the thickness of the magnetic layer is 1 $\mu$m or less and $\frac{1}{2}$ or less, preferably $\frac{1}{3}$ or less, of the thickness of the non-magnetic layer. There are used two kinds of abrasives each having the Mohs' hardness of 6 or more, preferably 7 or more, and comprising a first abrasive having an average particle size (i.e., an average length in the long axis) of 0.8 to 1.4 times, preferably 0.85 to 1.3 times, as large as the average particle size of the ferromagnetic powder and a second abrasive having an average particle size of 2 to 4 times, preferably 2.3 to 3.6 times, as large as the average particle size of the ferromagnetic powder. As a result, there can be obtained without lowering the filling density of the ferromagnetic powder contained in the magnetic layer, a flexible magnetic recording disk (hereinafter referred to simply as a magnetic disk) having an excellent surface property and a magnetic layer with a thickness of 1 $\mu$m or less, preferably 0.8 $\mu$m or less, most preferably 0.5 $\mu$m or less, and also having excellent electromagnetic characteristics and a high durability while the disk is in a thin layer. The term "average particle size" means an average length in the long axis.

The effects of the present invention are briefly explained below.

Limiting the thicknesses of the magnetic layer and non-magnetic layer in the present invention as described above secures certain electromagnetic characteristics such as an overwriting characteristic while reducing self-demagnetization loss, and prevents the peeling of the magnetic layer while loosening the contact of the magnetic head to the magnetic disk.

Further, regulating the sizes of the abrasives in relation to the average particle size of the ferromagnetic powder to limit them to abrasives having two kinds of size distributions can control the distribution of the abrasive in the vicinity of a magnetic layer surface, particularly the abrasive having a large size, to a specific range while securing the mechanical strength of the magnetic layer mainly with the first abrasive having a small size and in turn allow the second abrasive mainly to be scattered on the magnetic layer surface. It is considered that running durability can be improved with a spike effect (i.e., a scratching effect) thereof.

That is, with respect to the effect brought by using two kinds of the abrasives each having a different size, it is believed that the effect of the first abrasive with a size of 0.8 to 1.4 times as large as the average particle size of the ferromagnetic powder is attributable to the effect caused by filling a coated layer with an inorganic substance, and the magnetic layer itself is strengthened thereby. Further, the second abrasive with a size of 2 to 4 times as large as the average particle size of the ferromagnetic powder can be added preferably after dispersion of the first abrasive to be present on the surface of the magnetic layer without reducing the filling density in the magnetic layer, whereby the magnetic disk can be provided with durability.

The mixing ratio of the first abrasive and the second abrasive is in the range of preferably 50 weight % or less, more preferably 1 to 40 weight %, for the second abrasive based on the total of the first abrasive and second abrasive. Where the abrasive includes both the first abrasive and second abrasive, it will be hereinafter referred to simply as the abrasive.

In the present invention, the presence density of the abrasive particles on the magnetic layer is preferably controlled to 0.16 to 0.24 particle/$\mu$m$^2$ wherein "the density of the abrasive particles on the magnetic layer" means the presence density of the abrasive particles, the whole body of the abrasive particle on the magnetic layer surface which is not buried under the average level of a binder resin and which has a portion protruding from the magnetic layer surface. To be concrete, it means the presence density of the abrasive particles exposed by removing by a plasma treatment the binder covering the surface of the abrasives having a protruded portion. This plasma treatment process is explained below.

A conventional plasma reactor is used in which: a high frequency electric power with a transmitted frequency of 13.56 MHz is supplied to a reaction unit; $O_2$ is allowed to flow into the reaction unit at 30 ml/minute while the reaction unit is maintained in a condition of a vacuum degree of 20 to 30 Pa (Pascal); $O_2$ is subjected to a plasma treatment at the conditions of output impedance of 50$\Omega$ and electric power of 20 W for 5 to 40 minutes; $O_2$ is placed in a plasma condition with high frequency energy added to a high frequency supplying electrode; and this plasma $O_2$ removes an organic substance including the binder resin on the magnetic layer surface.

Next, after drying the above sample, the surface thereof is photographed with an electron microscope at 2000 to 10000 magnifications to count the abrasive particles present on the surface. Usually, 4 to 10 portions per one sample are photographed at 5000 magnifications and the number is calculated from the total thereof.

The presence density of these abrasive particles after the plasma treatment is preferably 0.16 to 0.24 particle/$\mu$m$^2$, more preferably 0.18 to 0.23 particle/$\mu$m$^2$. A presence density of less than 0.16 particle/$\mu$m$^2$ does not allow a sufficient durability to be obtained, and one of more than 0.24 particle/$\mu$m$^2$ unfavorably lowers the output at a short wavelength recording frequency.

Among the abrasive particles present on the magnetic layer, the number of second abrasive particles is preferably 10% (by number) or more, more preferably 15 to 70% (by number), based on the total number of abrasive particles.

The protrusion of the abrasive particle present on the magnetic layer has a height falling within the range of preferably 0.001 to 0.4 $\mu$m, more preferably 0.01 to 0.3 $\mu$m.

Basically, a method for controlling the number of abrasive particles present in the vicinity of the magnetic layer surface to the range of 0.16 to 0.24 particle/$\mu$m$^2$ preferably satisfy at least the relationship between the thicknesses of the magnetic layer and the non-magnetic layer and the relationship of the size of the abrasive with that of the ferromagnetic powder. In order to further ensure the above ranges, various means are preferably used in combination. The reason therefor is that only an increase in the amount of the abrasive particles, particularly the amount of the second abrasive particles contained in the magnetic layer coating solution brings about a reduction of a filling density, as described above. The means concerned is concretely explained below.

(1) The first abrasive particles are subjected to a dispersion treatment in a binder resin solution together with a ferromagnetic powder and then the second abrasive particles are added thereto, whereby a magnetic layer coating solution is prepared.

First, the first abrasive particles are sufficiently kneaded and dispersed by means of, for example, a kneader together with the binder resin and the ferromagnetic powder. Then the second abrasive particles are added to this dispersion and dispersed, whereby the first abrasive can uniformly be distributed in the magnetic layer and the second abrasive can suitably be distributed on the magnetic layer.

More specifically, in the dispersing method for the abrasive in preparing the magnetic layer coating solution, the first abrasive particles are subjected to a sufficient kneading treatment with a kneader such as a pressure kneader, an open kneader and a continuous kneader together with a binder resin, a ferromagnetic powder, and if necessary, an additive such as a compound having a carboxyl group in a small amount of a solvent for the binder resin for 0.5 to 5 hours; then, a solvent is further added to the kneaded material and it is subjected to a dispersion treatment by means of a dispersion processing equipment such as a sand mill, a disperser and a high speed mixer for 0.5 to 5 hours (the second abrasive is added and dispersed at a prescribed time at the beginning or middle of this treatment), whereby the first abrasive is uniformly distributed in the magnetic layer coating solution before the second abrasive is introduced.

(2) A slower drying than that obtained with conventional drying conditions is applied.

The slower drying extends the time of the still condition in a magnetic coating solution containing a dispersing solvent provided on a non-magnetic support. The slow vaporization of the solvent allows the second abrasive to be more likely to be present on a magnetic layer surface. In particular, it is effective when a nonmagnetic layer and a magnetic layer are formed by a wet-on-wet coating process.

To be concrete, the magnetic coating solution is left to stand for a prescribed time under a continuous or intermittent temperature environment in this slower drying condition. To be more concrete, the magnetic coating solution is passed at a temperature of 20° to 120° C. and a transporting speed of 50 to 800 m/minute for 3 to 120 seconds.

(3) The viscosity of a magnetic coating solution is relatively decreased, that is, the amount of a dispersing solvent is increased.

It is possible to allow much of the second abrasive particles to be present in the vicinity of the magnetic layer surface by the same mechanism as the method of (2) in combination with a drying condition.

The viscosity of this magnetic layer coating solution is generally 5 to 10000 centipoise, preferably 20 to 1000 centipoise.

(4) An abrasive with a relatively small specific gravity is selectively used or an abrasive with a relatively large specific surface area or an abrasive having the combination of these physical properties is used, as the first abrasive and the second abrasive of the present invention.

For example, examples of the first abrasive include $Cr_2O_3$ and $Al_2O_3$ and examples of the second abrasive include $Al_2O_3$. The specific surface area is preferably 1 to 30 $m^2/g$.

(5) In a calendering treatment after coating, the calendering pressure and temperature are reduced.

They can be controlled to a lower level to press the abrasive particles present on a magnetic layer after coating into the magnetic layer. In particular, this method is an effective means for a recording disk in which a non-magnetic layer and a magnetic layer are simultaneously coated.

A linear pressure of generally 50 to 500 kg/cm, preferably 100 to 400 kg/cm, at a temperature of generally 20° to 130° C., preferably 40° to 120° C., are the pressure conditions for calendering.

With the magnetic disk of the present invention, there are no specific limitations as to the manufacturing method thereof, as long as the non-magnetic layer is provided on a non-magnetic support and the magnetic layer is provided on the non-magnetic layer. However, it is preferred that the thickness of the magnetic layer is uniform and that coating defects such as a pin holes are prevented, so as to manufacture it with a good yield. Also, the adhesion of the non-magnetic layer to the magnetic layer is increased to prevent peeling of the magnetic layer by manufacturing the magnetic disk by coating a magnetic layer coating solution thereon while the non-magnetic layer formed by coating a non-magnetic layer coating solution on the non-magnetic support remains in a wet condition (that is, a wet-on-wet coating) and then, drying, followed by subjecting it again to a surface treatment.

In the wet-on-wet coating system, the magnetic layer coating solution may be applied at the same time as or after applying the non-magnetic layer coating solution, as long as the coated layer of the non-magnetic layer coating solution remains in a wet condition.

In the present invention, the simultaneous multilayer coating system as shown in JP-A-62-212933 can be used to carry out more efficient manufacturing. The following constitutions are examples of the equipment and process for coating the magnetic recording medium of multi-layered constitutions of the present invention.

1. A method in which at first a non-magnetic layer is coated with a gravure coating, roll coating, blade coating or extrusion coating equipment generally used for applying a magnetic layer coating solution. While it remains in a wet condition, a magnetic layer is coated with the support pressure type extrusion coating equipment disclosed in JP-B-1-46186 (the term "JP-B" as used herewith means an examined Japanese patent publication), and JP-A-60-238179 and JP-A-2-265672.

2. A method in which a non-magnetic layer coating solution and a magnetic layer coating solution are simultaneously coated with one coating head having two built-in slits for extruding a coating solution as disclosed in JP-A-63-88080, JP-A-2-17971 and JP-A-2-265672.

3. A method in which a non-magnetic layer coating solution and a magnetic layer coating solution are almost simultaneously coated with an extrusion coating equipment with a backup roll as disclosed in JP-A-2-174965.

In order to prevent a reduction of the electromagnetic characteristics due to the coagulation of a ferromagnetic powder, a coating solution in the inside of a coating head is preferably provided with shearing by the methods described in JP-A-62-95174 and JP-A-1-236968.

A calendering treatment is an example of the surface forming treatment. There can be used as the calendering treatment roll, a plastic roll having a heat resistance, such as an epoxy, polyimide, polyamide, or polyimideamide roll. Further, the treatment can be carried out with the metal rolls themselves. The treatment condition is preferably in the range of the above described means (5) for controlling the presence density of the abrasive on a magnetic layer.

In the present invention, the thickness of the magnetic layer is 1.0 $\mu$m or less, preferably 0.8 $\mu$m or less, most preferably 0.5 $\mu$m or less. Accordingly, the overwriting characteristic specific to a digital recording can be improved to a large extent. The higher the line recording density becomes, that is, the shorter the recording wavelength becomes, the more the effect of the magnetic layer thickness is demonstrated.

In such a high recording density thin layer magnetic disk, ferromagnetic metal powder is suitable as the ferromagnetic powder as described above. It is required to obtain a stable reproduction output with a circumferential evenness, and that requires an orientation degree ratio of at least 0.85 or more, wherein the orientation degree ratio is the value obtained by dividing a minimum squareness ratio with a maximum squareness ratio in a circumferential ratio.

Means for achieving an orientation degree of 0.85 or more include a random orientation method in which a permanent magnet is used, as described in JP-B-3-41895, or a method in which an alternating current magnetic field orientation is loaded, as described in JP-A-62-92132, JP-A-63-148417, JP-A-1-300427, and JP-A-1-300428.

As described above, a preferred embodiment of the present invention is a high density magnetic disk comprising a non-magnetic support having thereon a non-magnetic layer comprising mainly a non-magnetic powder and a binder resin. Provided thereon by a simultaneous multi-layered coating method, is a magnetic layer with a thickness of 0.8 $\mu$m or less comprising mainly a ferromagnetic powder and a binder resin. The number of abrasive particles with a Mohs' hardness of 6 or more present on the magnetic layer is 0.16 to 0 24 particle/$\mu m^2$; the abrasive comprises a first abrasive having an average particle size of 0.8 to 1.4 times as large as the average particle size of the ferromagnetic powder and a second abrasive having an average particle size 2 to 4 times as large as the average particle size of the ferromagnetic powder; and of these abrasives, the second abrasive is preferably distributed on the magnetic layer in a ratio of preferably 10% (by number) or more, more preferably 15 to 70% (by number), based on the total number of abrasive particles. This enables one to obtain a high density magnetic recording having good electromagnetic characteristics with an excellent durability at a high density.

There are used as the abrasives for the magnetic layer, materials which are generally used, such as fused alumina, silicon carbide, chromium oxide ($Cr_2O_3$), corundum, artificial corundum, diamond, artificial diamond, garnet, and emery (main components: corundum and magnetite). These abrasives have a Mohs' hardness of 6 or more. Concrete examples thereof include HIT 50, HIT 55, HIT 60, AKP-10, AKP-12, AKP-15, AKP-20, AKP-30, AKP-50, AKP-1520, and AKP-1500 (manufactured by Sumitomo Chemical Industrial Co., Ltd.); G5, G7, S-1 and Chromium Oxide K (manufactured by Nippon Chemical Ind. Co., Ltd.); UB40B (manufactured by Murakami Ind. Co., Ltd.); WA 8000 and WA 10000 (manufactured by Fujimi Abrasive Co., Ltd.); and TF-180 (manufactured by Toda Kogyo CO., Ltd.).

These abrasives are selected according to the average particle size of a ferromagnetic powder used. Those having the average particle size of generally 0.05 to 3 $\mu$m, preferably 0.1 to 1.5 $\mu$m, are effective. These abrasives are preferably added by generally 1 to 20 parts by weight, preferably 6 to 15 parts by weight, in case of the first abrasive, and by generally 0.1 to 5 parts by weight, preferably 0.2 to 4 part by weight, in case of the second abrasive based on 100 parts by weight of the ferromagnetic powder. The total amount of the abrasive added is in the range of 5 to 22 parts by weight per 100 parts by weight of the ferromagnetic powder. An amount of less than 5 parts by weight can not provide a sufficient durability, and an amount of more than 22 parts by weight deteriorates filling degree resulting in an insufficient output.

In the magnetic recording medium of the present invention, there can be used as a ferromagnetic powder contained in the magnetic layer, an iron oxide series ferromagnetic powder, a ferromagnetic metal powder, or a ferromagnetic hexagonal series powder. Among them, the ferromagnetic metal powder having a small particle size suitable for a magnetic recording medium for a high density recording is preferred.

When the ferromagnetic powder is a ferromagnetic metal powder, the particles thereof desirably have a specific surface area of 30 to 80 $m^2/g$, and a crystallite size of 100 to 300Å as measured with an X-ray diffraction method. A specific surface area which is too small (i.e., less than 30 $m^2/g$) can not sufficiently achieve high density recording. When it is too large (i.e., more than 80 $m^2/g$) one can not sufficiently disperse the magnetic powder so as to form a smooth magnetic layer surface, and is not preferred since it can not meet as well the high density recording.

Crystallite size can be determined from the distribution of a half band width in the diffraction spectra of a (1, 1, 0) face and a (2, 2, 0) face.

A powder containing at least Fe can be mentioned as the above ferromagnetic metal powder. To be concrete, there are available the metal elements or alloys mainly composed of Fe, Fe—Co, Fe—Ni and Fe—Ni—Co. In order to provide a magnetic recording disk of the present invention with a high density recording property, while the particle size of the ferromagnetic powders is required to be small as described above, the magnetic characteristics include a saturation magnetization ($\sigma s$) of at least generally 110 emu/g or more, preferably 120 emu/g or more. The coercive force thereof is generally 800 Oe (oersted) or more, preferably 900 Oe or more. The length in the long axis (that is, the average particle size) of the powder obtained with a transmitting type electron microscope is generally 0.50 $\mu$m or less, preferably 0.10 to 0.35 $\mu$m and the axis ratio (length in the long axis/length in the short axis) is generally 5 or more, preferably 20 or less, and more preferably 6 to 15.

In order to further improve the characteristics, metal elements such as B, C, Al, Si and P are contained in the composition in some cases. Usually, an oxide layer is formed on the particle surface of the above metal powder for the sake of chemical stabilization.

There can be used as the method for forming the oxide, a known gradual oxidization treatment (that is, a method in which a metal powder is dipped in an organic solvent and then dried), a method in which a metal powder is dipped in an organic solvent and then a gas containing oxygen is blown in to form an oxide film on a surface thereof, followed by drying, and a method in which the partial pressures of an oxygen gas and an inert gas are controlled to form an oxide layer on the surface thereof without using an organic solvent. A metal powder which is subjected to any treatment can be used.

In the case of a ferromagnetic hexagonal series ferrite powder, the powder preferably has a specific surface area of 25 to 80 m$^2$/g, a tabular ratio (a tabular diameter/tabular thickness) of 2 to 30, and a tabular diameter of 0.02 to 1.0 μm. For the same reasons as with the ferromagnetic metal powder, a too large or too small particle size makes it difficult to record in a high density.

The ferromagnetic hexagonal series ferrite powder is ferromagnetic powder which is tabular and has an axis of easy magnetization in a direction vertical to the plate thereof. Examples of the powder include barium ferrite, strontium ferrite, lead ferrite, calcium ferrite, and the cobalt-substituted compounds thereof. Among them, particularly preferred are the cobalt-substituted compounds of barium ferrite and the cobalt-substituted compounds of strontium ferrite. Further, elements such as In, Zn, Ge, Nb and V may be added in order to improve the characteristics thereof according to necessity. In order to provide the magnetic recording disk of the present invention with a high density recording property, while the particle size of the above hexagonal series ferrite powder is preferably small as described above, the magnetic characteristics thereof include a saturation magnetization ($\sigma s$) of at least generally 50 emu/g or more, preferably 53 emu/g or more, and the coercive force of generally 500 Oe or more, preferably 600 Oe or more. The ferromagnetic hexagonal series ferrite powder has a rather low output in case of a long wavelength recording as compared with the outputs of the other magnetic particles. However, in case of a short wavelength recording of generally 1.5 μm or less, preferably 1.0 μm or less, a higher output than those of the other magnetic particles can be expected.

Magnetic characteristics such as saturation magnetization and coercive force were measured in a maximum loaded magnetic field of 10 kOe with a vibrating sample magnetometer (manufactured by Toei Kogyo Co., Ltd.). A specific surface area was measured by a BET method in which a quantarsorb (manufactured by Quantarchrom Co., Ltd., U.S.A.) is used. The value thereof was measured by a BET one point method (a partial pressure: 0.30) after dehydrating at 250° C. for 30 minutes in a nitrogen atmosphere.

These ferromagnetic powders may be subjected before dispersing to a treatment with a dispersing agent, a lubricant, a surface active agent, and an antistatic agent, each described later. To be concrete, it is described in JP-B-44-14090.

The non-magnetic layer of the magnetic recording medium of the present invention mainly comprises a nonmagnetic powder and a binder resin. The non-magnetic powder comprises an inorganic powder and an organic powder. It comprises preferably at least the inorganic powder and preferably carbon black.

In the magnetic recording medium of the present invention, a wet-on-wet coating process is preferably used. An important aspect of the wet-on-wet process is the visco-elastic characteristic (a thixotropic characteristic). That is, a large difference between the visco-elastic characteristics of the coating solutions for the magnetic layer and the non-magnetic layer causes the solutions to be mixed up at the interface of the coated magnetic layer and the coated non-magnetic layer in coating. When the magnetic layer has a very thin thickness as in the present invention, it is liable to cause the problem that the surface property of the magnetic layer is lowered.

The use of the same dispersed particles for the magnetic layer and the non-magnetic layer is an effective means for obtaining visco-elastic characteristics of the coating solutions which are close to each other. In the present invention, however, this is impossible, and accordingly particles which are easy to form a structural viscosity like carbon black are preferably used as the non-magnetic particle contained in the non-magnetic layer coating solution for the lower layer in order to meet a structural viscosity brought about by the structure constitution formed by the magnetism of the ferromagnetic powder contained in the magnetic layer coating solution. It is effective therefore in the present invention to use carbon black having a large oil absorption amount and a small particle size. Meanwhile, it is effective as well to use a non-magnetic inorganic powder having a small particle size, other than carbon black. Particles of 1 μm or less, for example, such as titanium oxide and aluminum oxide readily form a coating solution having the structural viscosity of the particles due to the suitable coagulation thereof.

As described above, carbon black has functions as an antistatic agent, for improvement in the layer strength, for reduction of the friction coefficient, and for providing a light-shielding property. These are varied according to the type of carbon black used. Accordingly, it is naturally possible to use the right-carbon black for the right purpose based on various characteristics such as particle size, oil absorption amount, electric conductivity and pH, while changing the kind, amount and combination thereof in the non-magnetic layer and the magnetic layer. Carbon black which can be used in the present invention is discussed, for example, *Handbook of Carbon Black* edited by Carbon Black Association.

Examples of the non-magnetic powder for use in the non-magnetic layer of the present invention include a non-magnetic inorganic powder, for example, metal, metal oxide, metal carbonate, metal sulfate, metal nitride, metal carbide, and metal sulfide. More specific examples thereof, used singly or in combination, include $TiO_2$ (rutile and anatase), $TiO_x$ (x is less than 2 or 3 to 5), cerium oxide, tin oxide, tungsten oxide, ZnO, $ZrO_2$, $SiO_2$, $Cr_2O_3$, α-alumina having an α-conversion rate of 90% or more, β-alumina, γ-alumina, α-iron oxide, geothite, corundum, silicon nitride, titanium carbide, magnesium oxide, boron nitride, molybdenum disulfide, copper oxide, $MgCO_3$, $CaCO_3$, $BaCO_3$, $SrCO_3$, $BaCO_4$, $CaCO_4$, and silicon carbide. They may be used alone or in combination. The form and size of these inorganic powders are not particularly limited and can be acicular, spherical and cubic. Different inorganic powders can be combined if needed and also in the case of a single inorganic powder, the particle size thereof can be optionally selected. The particle size is preferably from 0.01 to 2 μm.

Specific examples of the non-magnetic powder for use in the present invention include AKP-20, AKP-30 and AKP-50 (manufactured by Sumitomo Chemical Co., Ltd.), GS, G7 and S-1 (manufactured by Nippon Chemical Industrial Co., Ltd.), TF-100, TF-120 and TF-140 (manufactured by Toda Kogyo Co., Ltd.), TTO-55 series and ET-300W (manufactured by Ishihara Sangyo Kaisha Ltd.), and STT-30 (manufactured by Titan Kogyo K.K.).

Examples of the non-magnetic organic powder for use in the present invention include an acryl styrene series resin powder, a benzoguanamine resin powder, a melamine series resin powder, and a phthalocyanine series pigment. Other examples thereof include a polyolefin series resin powder, a polyester series resin powder, a polyamide series resin powder, a polyimide series resin powder, and a polyfluorinated ethylene resin powder. The organic non-magnetic powder can be prepared according to the methods described in JP-A-62-18564 and JP-A-60-255827.

Examples of the thermosetting resin or the reactive type resin include a phenol resin, an epoxy resin, a polyurethane setting type resin, a urea resin, a melamine resin, an alkyd resin, an acryl series reactive resin, a formaldehyde resin, a silicon resin, an epoxide-polyamide resin, a mixture of a polyester resin and an isocyanate prepolymer, a mixture of polyesterpolyol and polyisocyanate, and a mixture of polyurethane and polyisocyanate.

These resins are described in detail in *Plastic Handbook* published by Asakura Shoten. A known electron beam setting type resin may also be used for the non-magnetic layer or the magnetic layer. Examples and a manufacturing method for the preparation thereof are described in detail in JP-A-62-256219. The above resins can be used singly or in combination. Preferred resins include the combination of at least one resin selected from the group consisting of a vinyl chloride resin, a vinyl chloride-vinyl acetate resin, a vinyl chloride-vinyl acetate-vinyl alcohol resin, a vinyl chloride-vinyl acetate-maleic anhydride copolymer, and nitrocellulose, and a polyurethane resin, or a resin prepared by combining polyisocyanate therewith.

The constitution of the polyurethane resin includes a known polyester polyurethane, polyether polyurethane, polyether polyester polyurethane, polycarbonate polyurethane, polyester polycarbonate polyurethane, and polycaprolactone polyurethane. Preferred resins contain at least one or more polar groups selected from COOM, $SO_3M$, $OSO_3M$, $P=O(OM)_2$, $O-P=O(OM)_2$ (wherein M is a hydrogen atom or an alkali metal such as K, Li and Na), OH, $NR_2$, $N^+R_3$, (wherein R is a hydrocarbon group), an epoxy group, SH, and CN introduced into the resin by a copolymerization or addition reaction as needed in order to obtain excellent dispersibility and durability for the binders described above. The amount of the polar group is from $10^{-1}$ to $10^{-8}$ mole/g, preferably $10^{-2}$ to $10^{-6}$ mole/g, of the resin.

A binder for the magnetic layer and the non-magnetic layer of the present invention is contained in the range of preferably from 5 to 40% by weight, more preferably 10 to 30% by weight, based on the amounts of the ferromagnetic powder and the non-magnetic powder, respectively. When a vinyl chloride series resin is used, the amount thereof is from 5 to 100% by weight, and when a polyurethane resin is used, the amount thereof is from 2 to 50% by weight, and further polyisocyanate is used in an amount of from 2 to 100% by weight, based on the amounts of the ferromagnetic powder and the non-magnetic powder, respectively.

Where a polyurethane resin is used in the present invention, the polyurethane resin preferably has a glass transition point of from $-50°$ to $100°$ C., a break elongation of from 100 to 2000%, a break stress of from 0.05 to 10 kg/cm$^2$, and a yielding point of from 0.05 to 10 kg/cm$^2$.

The polyisocyanate for use in the present invention includes isocyanates such as tolylenediisocyanate, 4,4'-diphenylmethanediisocyanate, hexamethylenediisocyanate, xylylenediisocyanate, naphthylene-1, 5-diisocyanate, o-toluidinediisocyanate, isophoronediisocyanate, and triphenylmethanetriisocyanate, reaction products of these isocyanates and polyalcohols, and polyisocyanates prepared by condensing isocyanates. Useful commercially available isocyanates include Coronate L, Coronate HL, Coronate 2030, Coronate 2031, Millionate MR, and Millionate MTL (manufactured by Nippon Polyurethane Co., Ltd.); Takenate D-102, Takenate D-110N, Takenate D-200, and Takenate D-202 (manufactured by Takeda Chemical Industries Co., Ltd.); and Desmodur L, Desmodur IL, Desmodur N, and Desmodur HL (manufactured by Sumitomo Bayer Co., Ltd.). These isocyanates can be used for the respective layers singly or in combination of two or more utilizing the differences in their hardening reactivity.

The magnetic recording medium of the present invention fundamentally comprises two layers of a non-magnetic layer and a magnetic layer, but may comprise three layers or more. In the constitution of three layers or more, the magnetic layer or non-magnetic layer may comprise plural layers of two layers or more. In this case, the components (in addition to a binder resin, various powders such as a ferromagnetic powder and non-magnetic powder, and various additives) of the respective layers can suitably be determined.

Used as the additives in the present invention are those having a lubrication effect, an anti-electrification effect, a dispersion effect, and a plasticization effect. These additives can be added to either or both of the non-magnetic layer and the magnetic layer.

Useful examples of lubricants include silicon oils such as dialkyl polysiloxane (the alkyl group thereof having 1 to 5 carbon atoms), dialkoxy polysiloxane (the alkoxy group thereof having 1 to 4 carbon atoms), monoalkyl monoalkoxy polysiloxane (the alkyl group thereof having 1 to 5 carbon atoms and the alkoxy group thereof having 1 to 4 carbon atoms), phenyl polysiloxane, and fluoroalkyl polysiloxane (the alkyl group thereof having 1 to 5 carbon atoms); an electroconductive fine powder such as graphite; an inorganic powder such as molybdenum disulfide and tungsten disulfide; a plastic fine powder such as polyethylene, polypropylene, a polyethylene-vinyl chloride copolymer, and polytetrafluoroethylene; an α-olefin polymer; an unsaturated aliphatic hydrocarbon which is a liquid at room temperature (e.g., a compound in which a double bond of an n-olefin is bonded to a carbon atom at a terminal, having about 20 carbon atoms); fatty acid esters prepared from monobasic fatty acids having 12 to 20 carbon atoms and monohydric alcohols having 3 to 12 carbon atoms; and fluorocarbons.

Examples of the fatty acids include an aliphatic carboxylic acid or a mixture thereof such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid, and palmitoleic acid.

More specific examples of the fatty acid esters include the various ester compounds such as butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-1-propyl stearate, a compound prepared by acylating dipropylene glycol monobutyl ether with stearic acid, diethylene glycol dipalmitate, a compound prepared by acylating hexamethylene diol with myristic acid to convert to a diester, and glycerine oleate.

Furthermore, in order to reduce the hydrolysis of the fatty acid ester which occurs when a magnetic recording disk is used under conditions of high humidity, there can be selected fatty acid of a raw material, and an isomeric constitution such as branch/linear and cis/trans and a branched position of alcohol.

These lubricants are added in the range of from 0.2 to 20 parts by weight per 100 parts by weight of the non-magnetic powder contained in the non-magnetic layer or the magnetic powder contained in the magnetic layer.

All or part of the additives for use in the present invention may be added at any step of preparing the magnetic coating solution, for example, the additives may be mixed with a ferromagnetic powder prior to a kneading step, the additives may be added at a kneading step of the ferromagnetic powder and a binder in a solvent, the additives may be added at a dispersing step, the additives may be added after dispersing, or the additives may be added immediately before coating.

The organic solvents in the present invention can be used in an arbitrary ratio. Examples of the organic solvents include ketones such as acetone, methyl ethyl ketone, methyl isobutyl ketone, diisobutyl ketone, cyclohexanone, isophorone, and tetrahydrofurane; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane.

These organic solvents need not be 100% pure and may contain impurities such as isomers, unreacted matters, by-products, decompositions, oxides, water, in addition to the main components. The content of these impurities is preferably 30% or less, more preferably 10% or less, if necessary.

The organic solvent used in the present invention may be changed in the kind and amount thereof in the magnetic layer and the non-magnetic layer.

There can be listed as examples thereof, a solvent having a high volatility in the magnetic layer to improve the surface property, a solvent having a high surface tension (e.g., cyclohexane and dioxane) in the non-magnetic layer to increase the stability in coating, and a solvent having a high solubility parameter in the non-magnetic layer to increase the filling degree. However, the present invention is naturally not limited to these examples.

There can be listed as the non-magnetic support used in the present invention, the films of various synthetic resins including polyesters such as polyethylene terephthalate and polyethylene naphthalate, polyolefins such as polyethylene and polypropylene, cellulose triacetate, polycarbonate, polyamide, polyimide, polyamideimide, polysulfon, polyethersulfon, syndiotactic polystyrene, and polyparaphenylene benzobisoxazole, and a metal foil such as an aluminum foil and a stainless steel foil. In general, the non-magnetic support having a thickness of generally 1 to 100 $\mu$m, preferably 25 to 85 $\mu$m, is used.

These supports may be subjected in advance to corona discharge treatment, plasma treatment, an adhesion promoting treatment, heat treatment and a dust-preventing treatment. In order to better achieve the effects of the present invention, a non-magnetic support is preferably used having a centerline average surface roughness (Ra) (cut-off value: 0.25 mm) of preferably 0.03 $\mu$m or less, more preferably 0.02 $\mu$m or less, and most preferably 0.01 $\mu$m or less. The preferred non-magnetic support, in addition to a small centerline average surface roughness, has no coarse protrusions of 1 $\mu$m or more. The surface roughness can be controlled to the desired level by adjusting the size and amount of the filler added to the support as needed. Useful fillers include an acrylic type organic fine powder in addition to oxides and carbonates of Ca, Si and Ti.

The non-magnetic support for use in the present invention has preferably an F-5 (i.e., the load at the 5% elongation) value of 5 to 50 kg/mm$^2$ in the web running direction (longitudinal direction) and an F-5 value of 3 to 30 kg/mm$^2$ in the web width direction. In general, the F-5 value in the web length direction is higher than that in the web width direction, but the F-5 value is not particularly limited, especially when strength in the width direction is to be increased.

There may be provided an undercoating layer between the non-magnetic support and the non-magnetic layer for improving adhesion. The thickness thereof is generally 0.01 to 2 $\mu$m, preferably 0.05 to 0.5 $\mu$m. Further, there may be provided a back coating layer on the non-magnetic support side opposite to the magnetic layer. The thickness thereof is generally 0.1 to 2 $\mu$m, preferably 0.3 to 1.0 $\mu$m. Known materials can be used as the undercoating layer and the back coating layer.

The heat shrinkage rate of the non-magnetic support in the web running and width directions at 100° C. for 30 minutes is preferably 3% or less, more preferably 1.5% or less. The heat shrinkage rate at 80° C. for 30 minutes is preferably 1% or less, more preferably 0.5% or less. The breaking strength is preferably 5 to 100 kg/mm$^2$ in both directions, and the elastic modulus is preferably 100 to 2,000 kg/mm$^2$.

The process for preparing the magnetic layer coating solution and the non-magnetic layer coating solution for the magnetic recording disk comprises at least a kneading step, a dispersing step, and a mixing step provided before or after kneading and dispersing steps as needed. Each of the steps may be divided into two or more stages. At an initial or middle stage of any step, all raw materials may be added such as a ferromagnetic power, a non-magnetic powder, a binder, carbon black, an abrasive, an anti-electrification agent, a lubricant, and a solvent for use in the present invention. The respective raw materials may be divided and added in two or more steps. For example, polyurethane may be divided and added at a kneading step, a dispersing step and a mixing step for adjusting the viscosity after dispersing.

The surface inherent resistance on the magnetic layer surface of the magnetic recording medium of the present invention is preferably $1 \times 10^5$ to $5 \times 10^9$ ohm/sq.

The breaking strength of the magnetic layer is preferably 1 to 30 kg/cm$^2$. The heat shrinkage at every temperature of 100° C. or lower is preferably 1% or less, more preferably 0.5% or less, and most preferably 0.1% or less.

The residual solvent contained in the magnetic layer is preferably 100 mg/m$^2$ or less, more preferably 10 mg/m$^2$ or less. The residual solvent contained in the magnetic layer is preferably less than that contained in the non-magnetic layer.

The percentages of voids included in the magnetic layer and the non-magnetic layer each is preferably 30 volume % or less, more preferably 10 volume % or less. The percentage of voids included in the non-magnetic layer is preferably larger than that included in the magnetic layer, but it may be smaller if the percentage of voids included in the non-magnetic layer is 5% or more.

The magnetic recording medium of the present invention has a non-magnetic layer and a magnetic layer and it can readily be estimated that the physical properties thereof can be changed in the non-magnetic layer and the magnetic layer according to the purpose.

The magnetic recording disk of the present invention provides for high density magnetic recording. Particularly, the electromagnetic characteristics such as an overwriting characteristic and reproduction output essential for a digital data recording medium remain stable and are not deteriorated even for high density recording where the shortest recording wavelength is 1.5 μm or less. In addition, the running durability advantageously is not deteriorated as well.

Furthermore, in the case where not only the recording wavelength is shifted to a shorter wavelength but also where the track density is increased, the magnetic recording disk of the present invention provides for recording having a decreased signal stroke and excellent separation of the peak shift. Because of this, even when recording at the shortest recording wavelength under conditions of a recording track width of 50 μm or less and a track density of 14 tracks/mm or more, the magnetic disk of the present invention enables recording/reproduction having an excellent overwriting characteristic and good running durability.

EXAMPLES

The present invention is described below in further detail with reference to the following Examples. It can be readily understood by one of ordinary skill in the art that the components, ratios, procedures, and others can be changed as long as they do not deviate from the scope of the present invention.

Accordingly, the present invention should not be construed as being limited to the following Examples. In the Examples, a "part" means a "part by weight".

EXAMPLE 1

A non-magnetic layer coating solution and a magnetic layer coating solution were prepared by the following procedure.

| Non-magnetic layer coating solution: | |
| --- | --- |
| Non-magnetic inorganic powder | 90 parts |
| TiO$_2$ (TY 50 manufactured by Ishihara Sangyo Kaisha, Ltd.) Average particle size: 0.34 μm Specific surface area: 5.9 m$^2$/g by a BET method pH 5. 9 | |
| Carbon black (Ketjen Black EC manufactured by Lion Akzo Co., Ltd.) Average particle size: 30 mμ DBP oil absorption: 350 ml/100 g Specific surface area: 950 m$^2$/g by a BET method | 10 parts |
| Vinyl chloride-vinyl acetate-vinyl alcohol copolymer containing a polar group of —N(CH$_3$)$_{3+}$Cl$^-$: $3.5 \times 10^{-6}$ eq/g | 12 parts |
| Polyester polyurethane resin Neopentyl glycol/caprolactone polyol/MDI = 0.9/2.6/1 (by mol) containing a —SO$_3$Na group: $2 \times 10^{-4}$ eq/g | 5 parts |
| sec-Butyl stearate | 4 parts |
| α-Alumina (average particle size: 0.3 μm) | 10 parts |
| 2-Butoxy-1-propyl stearate | 3 parts |
| Butoxyethyl palmitate | 2 parts |
| Oleic acid | 1 part |
| Methyl ethyl ketone | 200 parts |
| Cyclohexanone | 200 parts |
| Magnetic layer coating solution: | |
| Ferromagnetic metal fine powder Composition: Fe/Ni/Al = 96/4/0.5 (atomic %) Hc: 1600 Oe Specific surface area by a BET method: 42 m$^2$/g Crystallite size: 255 Å Saturation magnetization (σs): 130 emu/g Particle size (length in the long axis): 0.26 μm Acicular ratio: 9 | 100 parts |
| Vinyl chloride series copolymer containing a —SO$_3$Na group: $0.7 \times 10^{-4}$ eq/g | 14 parts |
| Polyester polyurethane resin Neopentyl glycol/caprolactone polyol/ MDI: 0.9/2.6/1 (by mol) containing a —SO$_3$Na group: $1 \times 10^{-4}$ eq/g | 3 parts |
| Cr$_2$O$_3$ ("G-5" manufactured by Nippon Chemical Ind. Co., Ltd.) Average particle size: 0.32 μm Specific surface area: 2.5 m$^2$/g | 12 parts |
| Carbon black (average particle size: 0.10 μm) | 0.5 part |
| Isohexadecyl stearate | 6 parts |
| Oleic acid | 2 parts |
| Methyl ethyl ketone | 250 parts |
| Cyclohexanone | 130 parts |

In each of the non-magnetic layer coating solution and magnetic layer coating solution, the respective components were kneaded with a continuous kneader and then dispersed with a sand mill for 2 hours. α-Alumina ("AKP 15" manufactured by Sumitomo Chemical Co., Ltd., average particle size: 0.65 μm, specific surface area: 3.1 m/g) in an amount of 2 parts was added to the magnetic layer coating solution and dispersed once again with the sand mill for 3 hours. With respect to the respective dispersed solutions thus-obtained, polyisocyanate was added by 10 parts to the non-magnetic layer coating solution and by 12 parts to the magnetic layer coating solution. Further, butyl acetate in the amount of 40 parts was added to the respective solutions, and the solutions were flitrated with the filter having an average pore size of 1 μm, whereby the non-magnetic layer coating solution and the magnetic layer coating solution were prepared, respectively.

The viscosities were 150 centipoise for the non-magnetic layer coating solution and 100 centipoise for the magnetic layer coating solution (measured with a rotation viscometer). The non-magnetic layer coating solution thus obtained was applied on a polyethylene terephthalate support having a thickness of 62 μm and a center-average surface roughness of 0.01 μm, and the magnetic layer coating solution was applied thereon immediately thereafter, each at a coating speed of 150 m/minute by a wet simultaneous coating method which is the wet-on-wet coating method. The thickness of the non-magnetic layer after drying was 2 μm and that of the magnetic layer after drying became 0.5 μm, respectively. While both layers remained in a wet condition, the coated support was passed through an alternating current magnetic field generating equipment generating two magnetic fields, one at a frequency of 50 Hz and a magnetic field strength of 200 Gauss, the other at a frequency of 50 Hz and a magnetic field strength of 120 Gauss, to subject it to a random orientation treatment. After drying it at 25° C., 40° C., 60° C., 80° C. and 100° C. each for 8 seconds and at 120° C. for 3 seconds, the coated support was subjected to a treatment with a calendering equipment with seven stages at a temperature of 50° C. and a line pressure of 200 kg/cm. It was then punched into a 3.5 inch size disk, followed by subjecting the disk to a surface polishing treatment, then putting it in a 3.5 inch cartridge provided on the inside thereof with a liner, using a center core having a diameter of 29 mm, and mounting the other prescribed mechanism elements, whereby a 3.5 inch floppy disk was obtained.

EXAMPLE 2

A 3.5 inch floppy disk was prepared by the same manner as in Example 1, except that the drying condition was changed to 60° C., 80° C., 100° C., 100° C. and 100° C. each for 8 seconds and 120° C. for 3 seconds.

EXAMPLE 3

A 3.5 inch floppy disk was prepared by the same manner as in Example 1, except that the amounts of methyl ethyl ketone and cyclohexanone which were the dispersing solvents were reduced according to the ratio in Example 1, so that the viscosity of the magnetic layer coating solution was 300 centipoise, to thereby prepare the magnetic layer coating solution.

EXAMPLE 4

A 3.5 inch floppy disk was prepared by the same manner as in Example 1, except that the calendering treatment conditions were changed to a temperature of 90° C. and a line pressure of 300 kg/cm.

COMPARATIVE EXAMPLE 1

In dispersing the magnetic layer coating solution in Example 1, the respective components were kneaded with the continuous kneader and then dispersed by means of a sand mill for 5 hours without adding α-alumina. Subsequently, the magnetic layer coating solution was prepared in the same manner as in Example 1 to obtain a 3.5 inch floppy disk.

COMPARATIVE EXAMPLE 2

A 3.5 inch floppy disk was obtained under the same manner as in Example 1, except that α-alumina (AKP 15) in the amount of 2 parts contained in the magnetic layer coating solution of Example 1 was not added halfway to the sand mill but the alumina (AKP 15) was simultaneously kneaded together with the other components including the ferromagnetic powder of Example 1 with the continuous kneader, followed by dispersing the mixture with the sand mill for 5 hours.

EXAMPLE 5

A 3.5 inch floppy disk was obtained under the same manner as in Example 1, except that $Cr_2O_3$ ("G-5" manufactured by Nippon Chemical Ind. Co., Ltd.) in the amount of 12 parts contained in the magnetic layer coating solution in Example 1 was replaced with α-alumina ("HIT 55" manufactured by Sumitomo Chemical Co., Ltd., specific surface area: 8.5 $m^2/g$, average particle size: 0.23 μm) in the amount of 12 parts.

COMPARATIVE EXAMPLE 3

A 3.5 inch floppy disk was obtained under the same manner as in Example 1, except that $Cr_2O_3$ ("G-5" manufactured by Nippon Chemical Ind. Co., Ltd.) in the amount of 12 parts contained in the magnetic layer coating solution in Example 1 was replaced with α-alumina ("AKP 20" manufactured by Sumitomo Chemical Co., Ltd., specific surface area: 4.0 $m/g^2$, average particle size: 0.39 μm) in the amount of 12 parts.

COMPARATIVE EXAMPLE 4

A 3.5 inch floppy disk was obtained under the same manner as in Example 1, except that $Cr_2O_3$ ("G-5" manufactured by Nippon Chemical Ind. Co., Ltd.) in the amount of 12 parts contained in the magnetic layer coating solution in Example 1 was replaced with α-alumina ("UA 5155" manufactured by Showa Keikinzoku Co., Ltd., specific surface area: 15 $m^2/g$, average particle size: 0.20 μm) in the amount of 12 parts.

COMPARATIVE EXAMPLE 5

A 3.5 inch floppy disk was obtained under the same manner as in Example 1, except that α-alumina ("AKP 15" manufactured by Sumitomo Chemical Co., Ltd.) in the amount of 2 parts contained in the magnetic layer coating solution in Example 1 was replaced with α-alumina ("AKP 20" manufactured by Sumitomo Chemical Co., Ltd., specific surface area: 4.0 $m^2/g$, average particle size: 0.39 μm) in the amount of 2 parts.

COMPARATIVE EXAMPLE 6

A 3.5 inch floppy disk was obtained under the same manner as in Example 1, except that α-alumina ("AKP 15" manufactured by Sumitomo Chemical Co., Ltd.) in the amount of 2 parts contained in the magnetic layer coating solution in Example 1 was replaced with α-alumina ("AKP 10" manufactured by Sumitomo Chemical Co., Ltd., specific surface area: 2.1 $m^2/g$, average particle size: 1.07 μm) in the amount of 2 parts.

EXAMPLE 6

A 3.5 inch floppy disk was obtained under the same manner as in Example 1, except that amounts of $Cr_2O_3$ ("G-5" manufactured by Nippon Chemical Ind. Co., Ltd.) and α-alumina ("AKP 15" manufactured by Sumitomo Chemical Co., Ltd.) in the magnetic layer coating solution in Example 1 were changed to 20 parts and 3 parts, respectively.

COMPARATIVE EXAMPLE 7

A 3.5 inch floppy disk was obtained under the same manner as in Example 1, except that the non-magnetic layer coating solution was coated so that the coated thickness after drying was 0.9 μm and that the magnetic layer coating solution was coated so that the coated thickness after drying was 1.1 μm.

COMPARATIVE EXAMPLE 8

A 3.5 inch floppy disk was obtained under the same manner as in Example 1, except that $Cr_2O_3$ in the amount of 12 parts contained in the magnetic layer coating solution in Example 1 was not used and after the components other than $Cr_2O_3$ were kneaded with the continuous kneader similarly to Example 1, they were dispersed with the sand mill for 2 hours and thereafter α-alumina in the amount of 10 parts was added and the mixture was kneaded once again with the sand mill for 3 hours.

COMPARATIVE EXAMPLE 9

A 3.5 inch floppy disk was obtained under the same manner as in Example 1, except that $Cr_2O_3$ and α-alumina contained in the magnetic layer coating solution in Example 1 were not used and that $Cr_2O_3$ in the amount of 12 parts was replaced with α-alumina ("HIT 100" manufactured by Sumitomo Chemical Co., Ltd., average particle size: 0.11 μm) in the amount of 12 parts and α-alumina ("AKP 15" manufactured by Sumitomo Chemical Co., Ltd., average particle size: 0.65 μm) was replaced with α-alumina ("HIT 100" manufactured by Sumitomo Chemical Co., Ltd., average particle size: 0.11 μm) in the amount of 2 parts.

EXAMPLE 7

A 3.5 inch floppy disk was obtained under the same manner as in Example 1, except that $Cr_2O_3$ in the amount of 12 parts contained in the magnetic layer coating solution in Example 1 was not used and after the components other than $Cr_2O_3$ were kneaded with the continuous kneader similarly to Example 1, they were dispersed with the sand mill for 2 hours and that thereafter $Cr_2O_3$ ("G-5" manufactured by Nippon Chemical Ind. Co., Ltd., average particle size: 0.32 μm) in the amount of 20 parts used in Example 1 and α-alumina ("AKP 15" manufactured by Sumitomo Chemical Co., Ltd., average particle size: 0.65 μm) in the amount of 2 parts were added and the mixture was kneaded once again with the sand mill for 3 hours.

EXAMPLE 8

The non-magnetic layer coating solution used in Example 1 was coated on both sides of a 62 μm polyethylene terephthalate support (a center-average surface roughness: 0.01 μm) so that the coated thickness after drying was 2 μm, and the coated material was rolled up after drying under the same conditions as in Example 1. Thereafter, the magnetic layer coating solution used in Example 1 was coated on both sides of the rolled up material on which the non-magnetic layer coating solution had been coated so that the coated thickness after drying was 0.5 μm. The drying condition and the random orientation condition were the same as in Example 1. Thus, a 3.5 inch floppy disk was obtained.

The respective samples of the floppy disks thus-obtained were measured by the following evaluation methods. Presence density (a surface abrasive density) of the abrasive particles on the magnetic layer:

The surface was subjected to a plasma treatment with a plasma reactor ("PR 41" manufactured by Yamato Chemical Co., Ltd.) under the conditions of a transmitting frequency of 13.56 MHz, an output impedance of 50Ω, an output electric power of 20 W, a vacuum degree of 20 to 30 Pa (pascal), an oxygen flow amount of 30 ml/minute, and a time of 20 minutes. After drying, ten pictures were photographed with an electron microscope at a multiplying factor of 5000 magnifications to count the number of abrasive particles (that is, the total of the first abrasive and the second abrasive). The number of abrasive particles per $\mu m^2$ was calculated from the total thereof. The ratio of the second abrasive was shown altogether as well.

Reproduction output:

A sample was subjected to a recording with a disk test apparatus ("Model SK 606B" manufactured by Tokyo Engineering Co., Ltd.) with a metal-in-gap head having a gap length of 0.45 μm at a recording frequency of 625 kHz at a position of the radius of 24.6 mm, and then the reproduction output in a head amplifier was measured with an oscilloscope ("Model 7633" manufactured by Techtronics Co., Ltd.). The values of the examples and the comparative examples were obtained as the value relative to the output of Example 1, which was set at 100.

Overwrite:

A sample subjected to an alternating current demagnetization was subjected to a recording at the frequency of 312.5 kHz using a spectrum analyzer ("Model TR4171" manufactured by Advance Test Co., Ltd.) at a position of the radius of 39.5 mm and the output 01 (dB) of the 312.5 kHz component was measured. Then, the overwriting was immediately carried out at a frequency of 1 MHz, and an overwrite 02-01 (dB) was obtained from the output 02 (dB) of the 312.5 kHz component. Usually in a digital recording medium, −30 dB is said to be needed.

Running durability:

A sample was subjected to recording on the whole 240 tracks at a recording frequency of 625 kHz with a floppy disk drive ("Model FD 1331" manufactured by Nippon Electric Co,. Ltd.) and then, it was subjected to a thermocycle flow test at the position of 37.25 mm, in which a thermocycle flow described in Table 1 was one cycle. The running durability was evaluated by the running status after running the sample disk 15 million times in terms of a pass time under the above thermal condition.

TABLE 1

Thermocycle flow

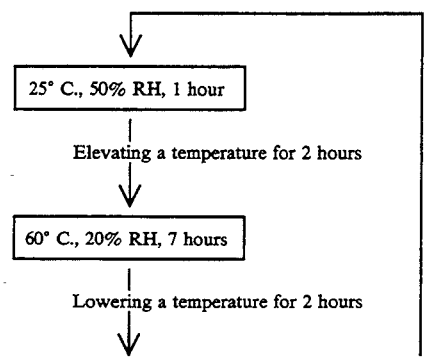

TABLE 1-continued

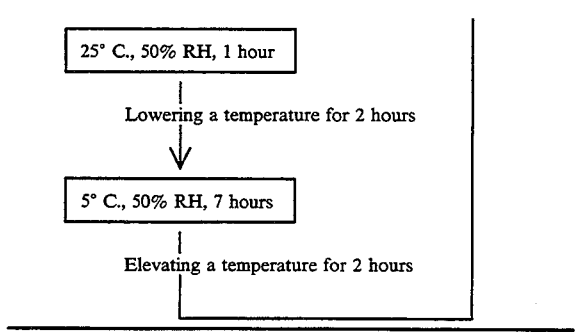

The characteristics of the examples and the comparative examples measured are by the above evaluation methods are shown in Table 2.

TABLE 2

| Sample No. | Running durability × 10⁴ pass) | Reproduction output (%) | Overwrite (dB) | Surface abrasive Overall density (particles/μm²) | Ratio of the second abrasive (%) |
|---|---|---|---|---|---|
| Example 1 | 1500 OK | 100 | −35 | 0.21 | 35 to 40 |
| Example 2 | 520 dropout occurred | 95 | −31 | 0.14 | 20 to 26 |
| Example 3 | 780 dropout occurred | 93 | −33 | 0.13 | 25 to 30 |
| Example 4 | 450 dropout occurred | 105 | −35 | 0.11 | 17 to 23 |
| Comp. Ex. 1 | 350 dropout occurred | 101 | −35 | 0.13 | 0 |
| Comp. Ex. 2 | 670 dropout occurred | 102 | −34 | 0.14 | 5 to 8 |
| Example 5 | 1500 OK | 102 | −34 | 0.22 | 37 to 45 |
| Comp. Ex. 3 | 1500 OK | 77 | −27 | 0.26 | 30 to 36 |
| Comp. Ex. 4 | 430 dropout occurred | 87 | −29 | 0.23 | 50 to 57 |
| Comp. Ex. 5 | 520 dropout occurred | 102 | −34 | 0.16 | 0 to 1 |
| Comp. Ex. 6 | 1500 OK | 71 | −24 | 0.23 | 20 to 30 |
| Example 6 | 1500 OK | 65 | −23 | 0.30 | 55 to 65 |
| Comp. Ex. 7 | 620 dropout occurred | 109 | −21 | 0.08 | 3 to 7 |
| Comp. Ex. 8 | 1500 OK | 71 | −28 | 0.38 | 100 |
| Comp. Ex. 9 | 350 dropout occurred | 98 | −31 | 0.23 | 0 |
| Example 7 | 1350 dropout occurred | 81 | −27 | 0.27 | 30 to 40 |
| Example 8 | 1140 dropout occurred | 101 | −32 | 0.26 | 50 to 60 |

As is apparent from the results summarized in the above table, in Example 2 contrary to Example 1, the drying condition is a rapid drying. The number of the surface abrasive is small and the durability is inferior. In Example 3, the viscosity of the coating solution is high (the viscosity in Example 1 is lower than that in Example 3) and the number of the abrasive is reduced. In Example 4, both the calender forming temperature and pressure are high as compared with those in Example 1 and the abrasive particles present on the magnetic layer surface are pressed into the magnetic layer and the non-magnetic layer. Accordingly, the number of the surface abrasive is decreased.

In Comparative Example 1, which is the example in which the second abrasive is not used, the durability is inferior to a large extent. In Comparative Example 2, in which the second abrasive is kneaded together with the ferromagnetic powder, particularly, the number of the second abrasive is reduced and the durability is not sufficient. In Comparative Examples 3 and 4, which are the examples in which the first abrasive is replaced with the abrasive having an average particle size deviating from 0.8 to 1.4 times as large as that of the ferromagnetic powder, the reduction in output and a deterioration of durability occurs. In Comparative Examples 5 and 6, which are the examples in which the second abrasive is replaced with the abrasive having an average particle size deviating from 2 to 4 times as large as that of the ferromagnetic powder, deterioration of the durability and reduction of the output occur. In Example 6, which is the example in which the number of the surface abrasive is increased, while the durability is excellent, the output and the overwriting characteristic are lowered to a large extent. In Comparative Example 7, which is the example in which the relationship of the thicknesses of the magnetic layer and the non-magnetic layer does not meet the present invention, the number of the surface abrasive is decreased, the running durability is deteriorated and the overwriting characteristic is reduced as well. In Comparative Example 8, which is the example in which only the second abrasive is used, while the running durability is satisfactory, the reproduction output and the overwriting characteristic are inferior. In Comparative Example 9, which is the example in which there were used the abrasives having the average particle sizes falling within the unsatisfactory ranges for both of the first abrasive and the second abrasive, the durability is inferior.

Therefore, it is clearly seen from the above that the high density flexible magnetic recording disk having good electromagnetic characteristics and excellent running durability can be obtained according to the present invention.

While the invention has been described in detail and with reference to specific embodiments thereof, it will be apparent to one skilled in the art that various changes and modifications can be made therein without departing from the spirit and scope thereof.

What is claimed is:

1. A flexible magnetic recording disk comprising a non-magnetic support having thereon (1) a non-magnetic layer comprising a non-magnetic powder and a binder resin, and (2) a magnetic layer comprising a ferromagnetic metal powder and a binder resin, in this order, wherein the magnetic layer has a thickness of 1 μm or less, which is ½ or less of the thickness of the non-magnetic layer; and the magnetic layer further contains abrasive particles having a presence density at the magnetic layer surface of 0.16 to 0.24 particle/μm² which comprises (i) first abrasive particles having a Mohs' hardness of 6 or more and an average particle size of 0.8 to 1.4 times as large as the average particle size of said ferromagnetic powder and (ii) second abrasive particles having a Mohs' hardness of 6 or more and an average particle size of 2 to 4 times as large as the average particle size of said ferromagnetic powder.

2. The recording disk as claimed in claim 1, wherein the abrasive particles in the magnetic layer have been exposed by removing the binder covering the surface of the abrasive particles having a protruded portion.

3. The recording disk as claimed in claim 1, wherein the non-magnetic layer was formed by the step of applying a non-magnetic coating solution onto the non-magnetic support; the magnetic layer was formed by the step of applying a magnetic coating solution onto the non-magnetic layer while the non-magnetic layer was in a wet condition; and then the recording disk was subsequently dried and then subjected to a surface treatment.

4. The recording disk as claimed in claim 1, wherein the first abrasive and the second abrasive both have a Mohs' hardness of 7 or more.

5. The recording disk as claimed in claim 1, wherein the first abrasive particles have an average particle size of 0.85 to 1.3 times the average particle size of the ferromagnetic powder and second abrasive particles have an average particle size of 2.3 to 3.6 times the average particle size of the ferromagnetic powder.

6. The recording disk as claimed in claim 1, wherein the magnetic layer has a thickness of 0.8 $\mu$m or less.

7. The recording disk as claimed in claim 1, wherein the magnetic layer has a thickness of 0.5 $\mu$m or less.

8. The recording disk as claimed in claim 1, wherein the ferromagnetic metal powder comprises particles which have a specific surface area of 30 to 80 $m^2/g$ and a crystallite size of 100 to 300Å as measured by an X-ray diffraction method.

9. The recording disk as claimed in claim 2, wherein the second abrasive particles are present in an amount of 15% to 70% by number based on the total number of abrasive particles.

10. The recording disk as claimed in claim 1, wherein the second abrasive particles are present in an amount of 15% to 70% by number based on the total number of abrasive particles.

11. A flexible magnetic recording disk comprising a non-magnetic support having thereon (1) a non-magnetic layer comprising a non-magnetic powder and a binder resin, and (2) a magnetic layer comprising a ferromagnetic metal powder and a binder resin, in this order, wherein the magnetic layer has a thickness of 1 $\mu$m or less, which is ½ or less of the thickness of the non-magnetic layer; and the magnetic layer further contains abrasive particles having a presence density at the magnetic layer surface of 0.16 to 0.24 particle/$\mu m^2$ which comprise (i) first abrasive particles having a Mohs' hardness of 6 or more and an average particle size of 0.8 to 1.4 times as large as the average particle size of said ferromagnetic powder and (ii) second abrasive particles having a Mohs' hardness of 6 or more and an average particle size of 2 to 4 times as large as the average particle size of said ferromagnetic powder; wherein the magnetic layer was formed from a magnetic layer coating solution which was formed by the steps of dispersing the first abrasive particles with ferromagnetic powder in a binder resin solution to form a dispersion and then adding the second abrasive particles to said dispersion.

* * * * *